March 15, 1938.  LE GRAND S. WHEDON ET AL  2,111,519
SEAT CONTROLLING MECHANISM
Filed Nov. 20, 1934
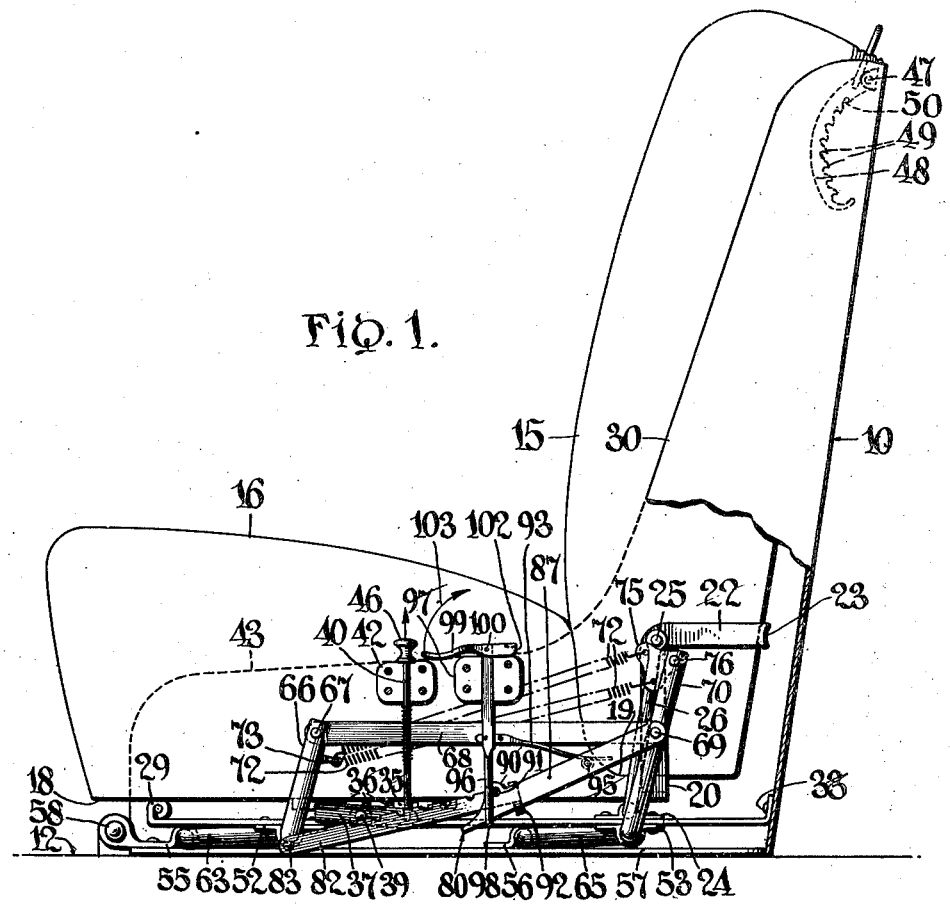
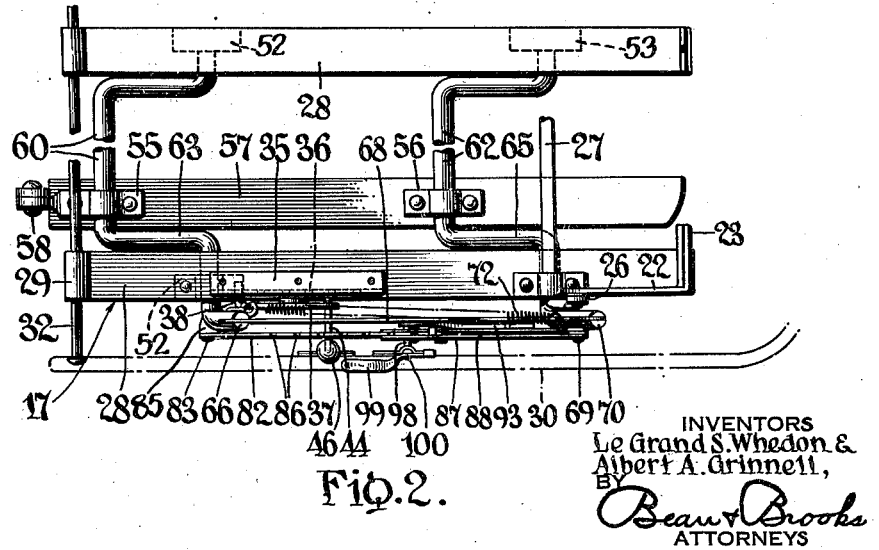

Patented Mar. 15, 1938

2,111,519

UNITED STATES PATENT OFFICE 2,111,519

SEAT CONTROLLING MECHANISM

Le Grand S. Whedon and Albert A. Grinnell, Medina, N. Y., assignors, by mesne assignments, to said Whedon Application November 20, 1934, Serial No. 753,966

3 Claims. (Cl. 155—14)

This invention relates to adjustable seats for use in vehicles, or for other purposes, and it has particular relation to an improved controlling and operating mechanism for a seat structure wherein seat supporting members, seat back and seat bottom can be relatively moved to conform readily to the position desired of persons having various heights, weights, or other characteristics that might require special seating arrangement.

The invention is concerned with improved controlling devices adapted to be incorporated in an adjustable seat structure, such as that described generally in the application of Albert A. Grinnell, Serial No. 694,815, filed October 23, 1933, wherein an occupant while seated may adjust the elements of the seating structure to provide comfortable upright seating posture for the back, or the seat may be so adjusted that the seat bottom is moved, as to its angular relation to the horizontal, in order to raise and lower portions thereof in conformity with the desires or physical characteristics of various types of persons, or the seat bottom may be moved bodily to various horizontal positions forwardly and rearwardly, while portions of the seat back can be adjusted forwarded and rearwardly at will, in addition to following in part the movement of the seat bottom.

One of the principal features of the invention is exemplified in the structure of a controlling mechanism that is incorporated in a seat raising or lifting device, and that locks or unlocks the seat structure in any of a series of positions while the weight of the operator does not interfere with simple and easy operation of the locking mechanism, whereas in other constructions of locking devices such weight might cause binding of parts or undesirable strain upon the strength of the operator.

An equalizing structure is included in the seat lifting device and resilient elements are provided which assist the operator in assuming the position desired. Especially in motor vehicles, the operator can pull or push slightly upon the steering wheel to operate the adjusting mechanism to the desired adjusted position by movements of the operator's body.

Another important characteristic of the invention lies in the provision of an efficient adjusting mechanism for seat structure wherein the seat retains a substantially even contour and without unsightly operating handles that are inconvenient to operate as well as requiring considerable space. In the present invention only a short cam lever that can be operated by the fingers is necessary for the complete control of the locking and unlocking mechanism.

In the drawing:

Fig. 1 is a side elevation of a seat structure with parts broken away to expose the operating elements included in the invention; and Fig. 2 is a plan of controlling and lifting device of the seat structure.

In practicing the invention, a seat structure 10 is installed upon a suitable support 12 which can be in the form of a vehicle floor, or the like, and includes separately assembled seat back 15 and seat bottom 16 supported upon a seat lifting device 17 which is frame-like in structure and carries the seat bottom thereon.

A suitable base 18 constituting the lower portion of the seat bottom has a rear extension 19 for receiving the lower portion of the seat back which rests thereon under its own weight thereon, and such extension is provided with a bracket 20 extending upwardly along the lower sides of the seat back. The upper portion of the bracket has an angular arm 22 horizontally disposed and provided with a finger 23 for guiding and positioning the lower portion of the seat back. It is, of course, to be understood that the structure of the bracket 20 is duplicated on opposite sides of the seat structure.

A pivotal connection 25 at the upper portion of each bracket 20 is provided for pivotally supporting the upper end of a normally upright arm 26 of a transverse rocker 27 rotatably mounted in a bearing bracket 24 upon the rear portion of an upper bar 28 of the frame. The front portion of the bar is provided with an upwardly turned and rounded bearing element 29 upon which the front end portion of the seat bottom is slidably supported. Thus the rear portion of the seat bottom is suspended in swinging relation from the pivotal connection 25 upon the rocker while the front portion of the seat bottom rides slidably upon the bearing 29. The frame bars 28 are rigidly attached at their opposite ends to a shell 30 by means of a transverse rod 32 at the front of the bars and by means of suitable bolts 33 at the rear of the bars. The shell conforms generally to the shape of the seat structure and partially embraces the seat back and seat bottom therein.

An angle rack bar 35 having notches 36 along its lower edge is secured to the lower portion of the seat bottom, and a latch 37 having an integral angular finger 38 at one end thereof is pivotally mounted, as indicated at 39, upon the adjacent bar 28. An actuating rod 40 slidably mounted in a plate 42 that is rigidly carried upon an upper edge portion 43 of the shell 30 has its lower end formed into an angular finger 44 and pivoted to the latch 37, whereas, its upper end is provided with a manually operable knob 46 for controlling the position of the seat bottom by adjustment of the latch in the desired notch 38. Since the lower portion of the seat back is positioned by the portions 22 and 23 of the brackets 20 upon the rear portion of the seat bottom, it is apparent that the lower portion of the back follows the movement of the seat bottom upon the arms 26 and bearing 29.

In order to provide additional adjustment of the seat back with respect to the shell 30, as well as to the seat bottom, a pivotal connection 47 carried by the upper portion of the shell supports one end of a pivotal arcuate arm 48 that is provided with a series of ratchet like teeth 49. These teeth are adapted to engage a cooperating transverse bolt 50 mounted in the upper portion of the seat back, thus providing for adjustment of the seat back toward and away from the shell and permitting upward and downward movement thereof according to the relative adjustment of the seat bottom.

Suitable bearing plates 52 and 53 are secured to the lower surface of each frame bar 28, and cooperating bearing plates 55 and 56 are secured to the upper surface of a lower parallel supporting bar 57 the forward end of which is provided, in conjunction with the plates 55, with pivotal connections 58 to the floor 12 of the vehicle. The entire seat structure can be tilted upwardly and forwardly about the connections 58. These bearing plates 55 and 56 carry a front rocker 60 and a rear rocker 62 that have front and rear rocker arms 63 and 65, respectively, formed integrally therewith for pivotally supporting the frame bars 28 in their bearing plates 52 and 53, and hence, support the seat structure. It will be observed that the outer end portions of the rocker arms 63 and 65 are bent at right angles and are carried in the bearing plates 52 and 53, respectively, and that the transverse body or axial portions of the rockers are carried in the bearing plates 55 and 56 respectively. Thus, the arms 63 and 65 operate in parallelism from the position shown in Fig. 1 to an upright position for raising the seat structure to various levels above the floor 12.

At one side of the seat bottom, the forward rocker arm 63 is provided with an integral angular extension 66 projecting upwardly from the lower or horizontal position of the arm, as shown in Fig. 1, and the outer portion of the arm is provided with a pivotal connection 67 to which one end of a link 68 is pivotally secured. The other end of the link likewise has a pivotal connection 69 for securing it to an intermediate portion of an angular integral extension 70 of the rear rocker arm 65. It will be observed that the integral extensions 66 and 70 of the respective rocker arms project in the same general direction although they are not necessarily parallel and that the rear extension 70 is longer than the forward extension 66.

A plurality of springs 72, each having its forward end connected intermediately of the extension 66 to a lug 73 thereon, and having its other end connected to a plate 75 pivotally secured, as indicated at 76, to the upper or outer end of the extension 70, exert a predetermined lifting force tending to raise the arms 63 and 65 toward an upright position. As these arms approach this upright position the lifting or raising force is gradually decreased because the pivotal axes about which the arms 63 and 65 turn are located in the rocker bearing plates 55 and 56, and the distance from the lug 73 or forward ends of the springs to the bearing axis of the rocker 60 in the front plate 55 is less than the distance from the pivotal connection 76 or rear ends of the springs to the bearing axis of the rocker 62 in the rear plate 56. Thus the opposite ends of the springs approach each other and lessen the spring tension as the rocker arms approach an upright position. It is, of course, to be understood that these springs are normally under tension.

A control mechanism 80 for the lifting structure includes a forward bar 82 having its forward end pivotally connected, as indicated at 83, to a lug 85 that is formed upon the forward rocker adjacent the junction of the rocker arm 63 and the angular extension 66 thereof. A plurality of notches 86 are formed upon the upper edge portion of the bar 82 toward the end thereof opposite the pivotal connection 83, and this end is slidable in the forward end portion of a channeled bar 87, the channel 88 thereof opening upwardly. The rear end of the channeled bar is carried upon the pivotal connection 69 at the intermediate portion of the rear angular extension 70. A pair of ears 90 formed adjacent the forward end of the channeled bar 82 are provided with a pin 91 rigidly secured transversely across the upper portion of the channel. The distance from the pin to the bottom of the channel is such that the bar 82 can slide freely in the channel when the two bars 82 and 87 are substantially alined longitudinally. It will be observed that a portion of the channeled bar 87 extends along the cooperating bar beyond the location of the pin 91.

A strap 92 is provided upon the end portion of the bar 82 and projects from the channel 88 into embracing relation about the outer and lower sides of the channeled bar 87 to insure and maintain proper assembled relation of the adjacent end portions of the bars 82 and 87, but without interfering with the relative slidable relation thereof when the bars are longitudinally alined. A spring 93 having one end secured to the link 68 extends toward the channeled bar and bears under tension upon a lug or projection 95 provided rigidly upon the side of the bar 87. This spring tends to pivot or move the adjacent ends of the bars downwardly and to maintain the bars in angular relation with the pin 91 anchored or locked in one of the notches 86.

An actuating rod 96 for operating the control mechanism is slidable in a plate 97 that is secured rigidly to the wall of the shell 30 adjacent the side of the seat bottom and its lower end is provided with an angular finger 98 extending beneath the channeled bar 87. The upper end of the rod is provided with a cam lever 99 having an intermediate pivotal connection 100 thereto and an end cam portion 102 that is slidable in camming action upon the upper edge of the plate 97. By manually pivoting the lever in the direction of the arrow 103, shown in Fig. 1, the rod 96 is drawn outwardly and the bars 82 and 87 are moved into substantial longitudinal alinement between the pivotal connections 83 and 69. In this position of the device the pin 91 is released from the notched end of the bar which is then slidable in the channel without interference from the pin.

Since it is apparent that the distance from the connection 83 to the rocking axis of the forward rocker 60 in the bearing plate 55 is less than the distance from the connection 69 to the rocking axis of the rear rocker 62 in the bearing plate 56, the movement of the rocker arms 63 and 65 toward upright positions will cause the pivotal connections 83 and 69 to move nearer each other. After the seat structure has been moved to a desired position of adjustment upon the rockers the lever 99 is actuated to its original position as shown in Fig. 1, and the inter-slidable ends of the bars 82 and 87 assume an angular relation under the pressure of the spring 93. Then the pin will immediately lock in one of the notches of the bar 82.

In adjusting the seat structure upon the rocker arms 63 and 65 from the position shown in Fig. 1, it is only necessary for the operator to draw his body forwardly either with or without the aid of the steering wheel of the vehicle while the rod 96 is drawn upwardly to permit relative sliding movement of the bars 82 and 87. The springs 72 can be sufficiently strong to raise the seat structure and a desired proportion of the weight of the operator. Since the springs lessen their force as the rocker arms approach an upright position the difference in leverage of the rocker arms in carrying weight from a substantially horizontal position to an upright position are substantially compensated. In adjusting the seat structure from raised position to a lower position it is only necessary to actuate the lever 99 and permit the seat to assume the desired position under the influence of the weight of the operator where the lever is again moved to its normal position to permit automatic locking of the bars 82 and 87, i. e., as soon as the finger 98 is lowered the pin 91 falls, together with the inner ends of the bars 82 and 87, under the influence of gravity into engagement with one of the notches 86. It will be noted that the entire controlling mechanism is inherent in the movable portions of the seat lifting and supporting elements and that stresses or strains imposed upon the rocker arms 63 and 65, the link 68, etc., are not imparted to the locking and controlling bars 82 and 87 or to the rod 96 or lever 99 for actuating such bars, during the movement of the seating structure.

Although only one form of the invention has been shown and described in detail, it will be apparent to those skilled in the art that the invention is not so limited, but that various changes may be made therein without departing from the spirit of the invention or from the scope of the appended claims.

We claim:

1. A seat structure comprising cushion carrying frame members, forward and rearward arms disposed substantially in parallelism and pivotally carrying said frame members to various positions of adjustment, means for pivotally supporting the arms, angular extensions provided upon the ends of the forward and rearward arms, respectively, a link connecting said extensions in substantial parallelism with a line joining the pivotal connections of the front and rear arms with the frame members, resilient means under predetermined tension connected from one extension to the other and tending to pivot said arms in one direction, the connection of the resilient means to one arm being a greater distance from the pivotal support of said one arm than the distance from the resilient connection of the other arm to the pivotal support of said other arm, sectional locking mechanism having a portion pivotally connected to the forward arm and having a portion pivotally connected to the rearward arm at different distances from the pivotal supports of the respective arms, locking means disposed on the respective sectional portions of said mechanism at a location spaced from the respective pivotal connections of said portions to said arms and selectively engageable with each other to maintain said arms in adjusted selective stationary positions, and means carried by one of the frame members for manipulating the interlocking means.

2. A seat structure comprising a front rocker arm and rear rocker arm on each side of the seat structure, cushion carrying frame members pivotally supported upon the upper portions of the rocker arms, said arms being arranged in substantially parallel relation, means for pivotally supporting the lower portions of the arms, a bar section pivoted upon an intermediate portion of one rocker arm and extending toward the other arm, a second bar section pivoted to said other arm at a distance from the pivotal support of the latter arm greater than the distance of the pivotal connection of first bar section to the pivotal support of the arm upon which it is mounted, one of the bar sections having a channel, the end portion of the other bar section having a rack portion slidably disposed in and angularly movable in the channel, the channeled bar portion having an element adjustably engageable with the rack portion in response to angular movement of the bar sections about their pivotal connections, and means for moving the bar sections into substantially aligned relation to release the element from locked position.

3. A seat structure comprising a cushion supporting frame, forward and rearward arms pivotal in substantially parallel relation to carry the frame members to various positions of adjustment, means for pivotally supporting the arms, a locking device having a section pivotally connected to the forward arm at a predetermined distance from the pivotal support of the latter, said mechanism having a second section pivotally connected to the rearward arm at a distance from the pivotal support of the latter arm different from said predetermined distance, said sections engaging each other at a location spaced from the respective pivotal connections thereof and being movable into angular positions with respect to each other about said connections, means on the engaging sections for limiting relative angular movement thereof about their pivotal connections, the engaging portions of said sections including interlocking mechanism for locking the portions in substantially rigid relation in response to movement of said portions into angular relation in one direction about their pivotal connections, said sections also including slidably interfitting guide portions, and means for actuating said sections from their angular locked relation to unlocked relation, whereby the sections are slidable in response to adjusting movement of the arms.

LE GRAND S. WHEDON.
ALBERT A. GRINNELL.